United States Patent
Cook et al.

(10) Patent No.: US 11,390,527 B2
(45) Date of Patent: Jul. 19, 2022

(54) MULTI-LAYERED SP$^2$-BONDED CARBON TUBES

(71) Applicant: TEXAS INSTRUMENTS INCORPORATED, Dallas, TX (US)

(72) Inventors: Benjamin Stassen Cook, Addison, TX (US); Nazila Dadvand, Richardson, TX (US); Luigi Colombo, Dallas, TX (US); Archana Venugopal, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 753 days.

(21) Appl. No.: 16/229,822

(22) Filed: Dec. 21, 2018

(65) Prior Publication Data
US 2019/0202700 A1    Jul. 4, 2019

Related U.S. Application Data

(60) Provisional application No. 62/611,483, filed on Dec. 28, 2017.

(51) Int. Cl.
 *B32B 9/00* (2006.01)
 *C01B 32/184* (2017.01)
 (Continued)

(52) U.S. Cl.
 CPC ............ *C01B 32/184* (2017.08); *C01B 32/16* (2017.08); *C01B 32/194* (2017.08);
 (Continued)

(58) Field of Classification Search
 CPC ......... B32B 9/007; B82Y 30/00; B82Y 40/00; Y10T 428/30
 (Continued)

(56) References Cited

U.S. PATENT DOCUMENTS 7,653,279 B1    1/2010  Jacobsen
8,906,593 B1   12/2014  Nowak et al.
(Continued)

FOREIGN PATENT DOCUMENTS

RU    2577273 C1    3/2016
WO  2016080910 A1    5/2016

OTHER PUBLICATIONS

International Search Report for PCT/US2018/067997 dated Apr. 4, 2019.
(Continued)

*Primary Examiner* — Daniel H Miller
(74) *Attorney, Agent, or Firm* — Michael A. Davis, Jr.; Charles A. Brill; Frank D. Cimino

(57) ABSTRACT

A microstructure comprises a plurality of interconnected units wherein the units are formed of graphene tubes. The graphene tubes may be formed by photo-initiating the polymerization of a monomer in a pattern of units to form a polymer microlattice, removing unpolymerized monomer, coating the polymer microlattice with a metal, removing the polymer microlattice to leave a metal microlattice, depositing graphitic carbon on the metal microlattice, converting the graphitic carbon to graphene, and removing the metal microlattice. A ceramic may be deposited on the graphene and another graphene layer may be deposited on top of the ceramic to create a multi-layered sp$^2$-bonded carbon tube.

20 Claims, 2 Drawing Sheets

(51) Int. Cl.
  *C01B 32/194* (2017.01)
  *C01B 32/16* (2017.01)
  *C04B 35/628* (2006.01)
  *C04B 35/622* (2006.01)
  *B82Y 40/00* (2011.01)
  *B82Y 30/00* (2011.01)

(52) U.S. Cl.
  CPC .. *C04B 35/62227* (2013.01); *C04B 35/62844* (2013.01); *C04B 35/62873* (2013.01); *B82Y 30/00* (2013.01); *B82Y 40/00* (2013.01); *C04B 2235/5284* (2013.01); *C04B 2235/6028* (2013.01); *Y10T 428/30* (2015.01)

(58) Field of Classification Search
  USPC .......................................... 428/408; 423/448
  See application file for complete search history.

(56) References Cited

U.S. PATENT DOCUMENTS

| | | |
|---|---|---|
| 9,415,562 B1 | 8/2016 | Schaedler et al. |
| 10,748,999 B2 | 8/2020 | Cook et al. |
| 2006/0186502 A1 | 8/2006 | Shimotani et al. |
| 2010/0143701 A1 | 6/2010 | Zhu et al. |
| 2012/0261673 A1 | 10/2012 | Schulze et al. |
| 2013/0189444 A1 | 7/2013 | Kub et al. |
| 2013/0230722 A1 | 9/2013 | Fujii et al. |
| 2014/0140647 A1 | 5/2014 | Saxton |
| 2014/0315093 A1 | 10/2014 | Greer et al. |
| 2015/0176132 A1 | 6/2015 | Hundley et al. |
| 2016/0304346 A1 | 10/2016 | Zhang et al. |
| 2017/0044016 A1 | 2/2017 | Smith et al. |
| 2017/0082569 A1 | 3/2017 | Sommer et al. |
| 2017/0200909 A1 | 7/2017 | Sonkusale et al. |
| 2017/0278930 A1 | 9/2017 | Ruhl et al. |
| 2018/0088462 A1 | 3/2018 | Vyatskikh et al. |
| 2019/0013386 A1 | 1/2019 | Shinohara et al. |

OTHER PUBLICATIONS

International Search Report for PCT/US2018/068171 dated Apr. 18, 2019.
Xiaoyu Zheng et al., Ultralight, Ultrastiff Mechanical Metamaterials; Science 344 (2014) 1373-1377.
T. A. Schaedler, et al., Ultralight Metallic Microlattices; Science 334 (2011) 962-965.
Y. T. Liang, et al., Towards Rationally Designed Graphene-Based Materials and Devices, Macromol. Chem. Phys. 213 (2012) 1091-1100.
Li, et al. "High-Density Three-Dimension Graphene Macroscopic Objects for High-Capacity Removal of Heavy Metal Ions," Scientific Reports | 3: 2125 | DOI: 10.1038/srep02125, 2013, 6 pages.

MULTI-LAYERED SP²-BONDED CARBON TUBES

CROSS-REFERENCE TO RELATED APPLICATIONS

This application claims priority to U.S. Provisional Patent Application No. 62/611,483 filed on Dec. 28, 2017. This application is related to U.S. patent application Ser. No. 16/229,668 filed concurrently herewith which claims priority to U.S. Provisional Patent Application No. 62/611,347 filed on Dec. 28, 2017, and to U.S. patent application Ser. No. 16/230,070 filed concurrently herewith which claims priority to U.S. Provisional Patent Application No. 62/611,499 filed on Dec. 28, 2017, and to U.S. patent application Ser. No. 16/229,827 filed concurrently herewith, and to U.S. patent application Ser. No. 16/229,971 filed concurrently herewith which claims priority to U.S. Provisional Patent Application No. 62/611,511 filed on Dec. 28, 2017, and to U.S. patent application Ser. No. 16/230,045 filed concurrently herewith which claims priority to U.S. Provisional Patent Application No. 62/611,554 filed on Dec. 29, 2017, the contents of which are hereby incorporated by reference in their entireties.

FEDERALLY SPONSORED RESEARCH OR DEVELOPMENT

Not Applicable

BACKGROUND

Graphene is a single-layer $sp^2$-hybridized 2D network of carbon atoms that conceptually serves as the basis of many important allotropes of carbon. It can be stacked to form 3D graphite, rolled to form 1D carbon nanotubes, and fused to form 0D fullerenes. Owing to its strongly delocalized electron configuration, graphene exhibits exceptional charge carrier mobility, thermal conductivity, mechanical strength, and chemical stability. However, like other nanomaterials, the properties of graphene depend on its size, atomic structure, and physical environment. Graphene and graphene-based materials have tailorable properties that can be exploited in a broad range of devices, including transistors, capacitors, electron field emitters, transparent conductors, sensors, catalysts, and drug delivery agents. Other 2D crystals, most notably boron nitride and molybdenum disulfide, have also been isolated.

Two-dimensional (2D) $sp^2$-bonded carbon exists in the form of graphene, buckyballs and carbon nanotubes (CNTs). Graphene is "flat" or 2D, fullerenes ("Buckyballs") are spherical or 0D, and CNTs are tubes in 1D. Forming these materials in a singular, regular, repeatable structure has not previously been achieved. Superstructures of these materials may provide very strong, light, highly thermally and electrically conductive structures. Attempts have been made to fabricate $sp^2$-bonded sponges as shown in FIG. 1A, however these structures are irregular with properties that vary with position.

The isolation of graphene via the mechanical exfoliation of graphite has sparked strong interest in two-dimensional (2D) layered materials. The properties of graphene include exceptional strength, and high electrical and thermal conductivity, while being lightweight, flexible and transparent. This opens the possibility of a wide range of potential applications, including high-speed transistors and sensors, barrier materials, solar cells, batteries, and composites.

Other classes of 2D materials of interest include transition metal dichalcogenide (TMDC) materials, hexagonal boron nitride (h-BN), as well as those based on Group 14 elements, such as silicene and germanene. The properties of these materials can range from semi-metallic, for example, $NiTe_2$ and $VSe_2$, to semiconducting, for example, $WSe_2$ and $MoS_2$, to insulating, for example, hexagonal boron nitride (h-BN).

Growth of regular 3D superstructures using $sp^2$-bonded carbon may address the shortcomings of the flexible $sp^2$ carbons for 3D applications given that hexagonally arranged carbon is strong, chemically inert, electrically and thermally conductive, and optically transparent. Such 3D superstructures may find used in a number of applications from packaging, thin optically transparent electrically conductive strong thin films, and many more.

When a carbon atom is attached to three groups (or, as in the case of graphene, three other carbon atoms) and so is involved in three a bonds, it requires three orbitals in the hybrid set. This requires that it be $sp^2$ hybridized.

An $sp^2$-hybridized bond has 33% s and 67% p character. The three $sp^2$ hybrid orbitals point towards the corners of a triangle at 120° to each other. Each $sp^2$ hybrid is involved in a σ bond. The remaining p orbital forms the π bond. A carbon double bond may be viewed as a σ+π bond.

BRIEF SUMMARY

In one example, a process for preparing multi-layered graphene tubes comprises: fabricating polymeric tubes having a microlattice structure using a self-propagating photopolymer waveguide technique to selectively photo-initiate polymerization in a photomonomer; depositing a metal coating on the polymer tubes by an electroless process; dissolving out the polymeric core leaving metal hollow tubes; growing graphene on the hollow metal tubes; etching away the metal using sulfuric acid (or any other suitable etchant) to leave graphene hollow tubes; depositing a dielectric ceramic (such as, e.g., alumina, zirconia, etc.) on the graphene using ALD deposition; and, growing graphene on the ceramic coating.

In an example, the graphene tubes are interconnected by chemical electronic bonds in contradistinction to the van der Waals forces that may cause carbon nanotubes (CNTs) to agglomerate.

In one example, a microstructure comprises a plurality of interconnected units wherein the units are formed of multi-layered graphene tubes. The microstructure may comprise a plurality of interconnected units including at least a first unit formed of first graphene tubes; and a second unit formed of second graphene tubes wherein one or more of the second graphene tubes are connected to one or more of the first graphene tubes. The multi-layered graphene tubes that form the microstructure may be arranged in an ordered structure and form symmetric patterns that repeat along the principal directions of three-dimensional space.

BRIEF DESCRIPTION OF THE SEVERAL VIEWS OF THE DRAWING(S)

DETAILED DESCRIPTION

Figure 1A:
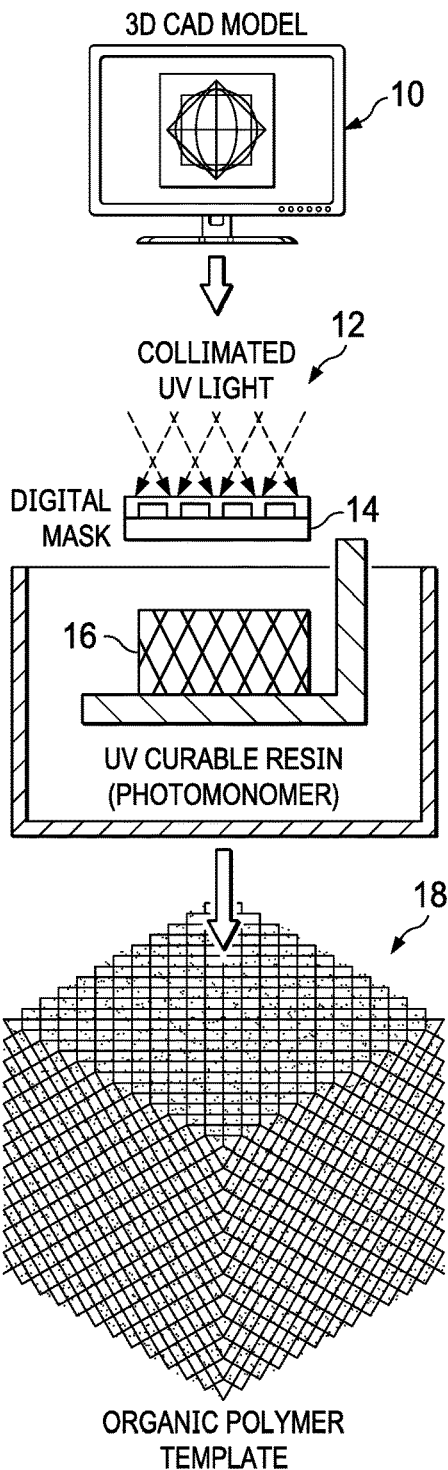
FIG. 1A is a schematic drawing of a fabrication process for a metal-based microlattice template in accordance with an example.

It has been found that an organic/inorganic superstructure may be used as a template for the formation of a 3D metal superstructure that may then be used to grow graphitic carbon on the surface of the metal. The template may be fabricated through a self-propagating photopolymer waveguide technique (see, e.g., Xiaoyu Zheng et. al., Ultralight, Ultrastiff Mechanical Metamaterials; *Science* 344 (2014) 1373-1377 and T. A. Schaedler, et al., Ultralight Metallic Microlattices; *Science* 334 (2011) 962-965). As illustrated schematically in FIG. 1A, an interconnected 3D photopolymer lattice may be produced upon exposure of an appropriate liquid photomonomer 16 to collimated UV light 12 through a specifically designed (e.g. using a computer-aided design model 10) digital mask 14 that contains openings with certain spacing and size. The fabricated organic polymer template microlattice 18 may then be coated by electroless copper or other suitable metal (e.g. Ni, Co, Au, Ag, Cu, and alloys thereof) followed by etching away the organic polymeric matrix (scaffold). The resulting metal-based microlattice may be then used as a template to grow the graphitic carbon. The thickness of the electroless plated metal may be controlled in the range of nanometer to micrometer by adjusting the plating time, temperature, and/or plating chemistry.

FIG. 1A schematically illustrates an exemplary fabrication process of organic polymeric microlattices (scaffolds) 18 prior to coating with electroless plating.

The present disclosure is of a "periodically structured" carbon nanostructure. The carbon nanostructures of the prior art are irregular and have much larger dimensions than those which may be achieved using the methodology disclosed herein.

The present process may be used to create a regular array, and the superstructure dimensions (unit) and structure may be optimized for strength, thermal and other fundamental properties.

There are several aspects of this procedure that are noteworthy:
- it provides a regular structure with defined dimensions;
- it can form very thin metal (e.g. Ni, Co, Cu, Ag, Au) microlattices;
- it enables the formation of graphitic carbon on very thin metals by a surface-limited process for very thin metal wires or tubes.

The present process uses a polymeric structure as a template for such fabrication with the subsequent formation of a metal superstructure that may then be exposed to a hydrocarbon (e.g. methane, ethylene, acetylene, benzene) to form graphitic carbon, followed by etching of the metal from under the graphitic carbon using appropriate etchants such as, for example, $FeCl_3$ or potassium permanganate.

Collimated UV light 12 through a photomask 14 or multi-photon lithography may be used in a photo-initiated polymerization to produce a polymer microlattice 18 comprised of a plurality of units. Exemplary polymers include polystyrene and poly(methyl methacrylate) (PMMA). Once polymerized in the desired pattern, the remaining un-polymerized monomer may be removed.

The polymer structure (polymer scaffold) may then be plated with a suitable metal using an electroless plating process.

Electroless nickel plating (EN) is an auto-catalytic chemical technique that may be used to deposit a layer of nickel-phosphorus or nickel-boron alloy on a solid workpiece, such as metal, plastic, or ceramic. The process relies on the presence of a reducing agent, for example hydrated sodium hypophosphite ($NaPO_2H_2.H_2O$) which reacts with the metal ions to deposit metal. Alloys with different percentages of phosphorus, ranging from 2-5 (low phosphorus) to up to 11-14 (high phosphorus) are possible. The metallurgical properties of the alloys depend on the percentage of phosphorus.

Electroless plating has several advantages over electroplating. Free from flux-density and power supply issues, it provides an even deposit regardless of workpiece geometry, and with the proper pre-plate catalyst, may deposit on non-conductive surfaces. In contradistinction, electroplating can only be performed on electrically conductive substrates.

Before performing electroless plating, the material to be plated must be cleaned by a series of chemicals; this is known as the pre-treatment process. Failure to remove unwanted "soils" from the part's surface results in poor plating. Each pre-treatment chemical must be followed by water rinsing (normally two to three times) to remove chemicals that may adhere to the surface. De-greasing removes oils from surfaces, whereas acid cleaning removes scaling.

Activation may be done with an immersion into a sensitizer/activator solution—for example, a mixture of palladium chloride, tin chloride, and hydrochloric acid. In the case of non-metallic substrates, a proprietary solution is often used.

The pre-treatment required for the deposition of metals on a non-conductive surface usually consists of an initial surface preparation to render the substrate hydrophilic. Following this initial step, the surface may be activated by a solution of a noble metal, e.g., palladium chloride. Electroless bath formation varies with the activator. The substrate is then ready for electroless deposition.

The reaction is accomplished when hydrogen is released by a reducing agent, normally sodium hypophosphite (with the hydrogen leaving as a hydride ion) or thiourea, and oxidized, thus producing a negative charge on the surface of the part. The most common electroless plating method is electroless nickel plating, although silver, gold and copper layers can also be applied in this manner.

In principle any hydrogen-based reducing agent can be used although the redox potential of the reducing half-cell must be high enough to overcome the energy barriers inherent in liquid chemistry. Electroless nickel plating most often employs hypophosphite as the reducer while plating of other metals like silver, gold and copper typically makes use of low-molecular-weight aldehydes.

A benefit of this approach is that the technique can be used to plate diverse shapes and types of surfaces.

Figure 1B:
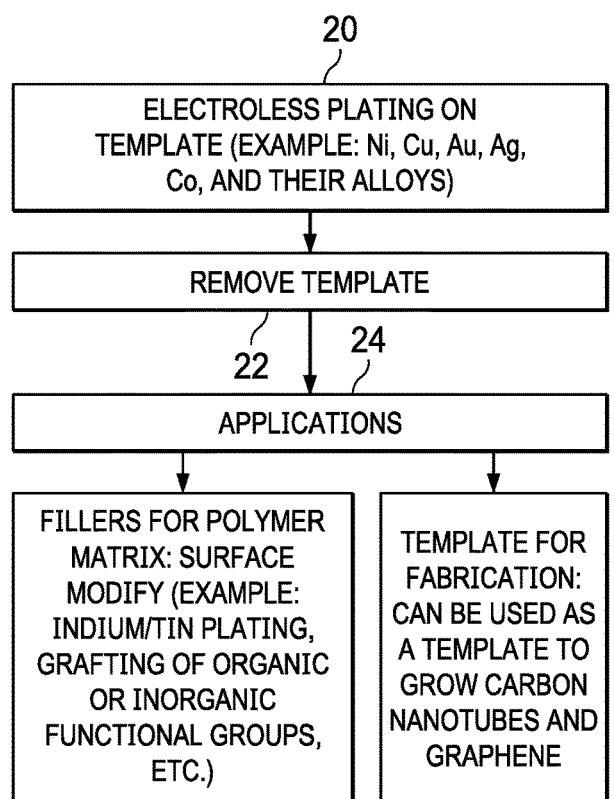
FIG. 1B is a flowchart for the fabrication process depicted schematically in FIG. 1A.

As illustrated in FIG. 1B, the organic polymeric microlattice may be electrolessly plated 20 with metal followed by dissolving out 22 the organic polymer scaffold. The resulting metal-based microlattice may be used in several applications 24—e.g. it may then be coated with a thin layer of immersion tin to prevent the metal from oxidizing during the subsequent process which may include a heat treatment. Alternatively, the surface of the metal-based microlattice may be functionalized with appropriate functional groups 26 to provide anchoring or reactions sites for subsequent interaction with a polymer matrix. A copper/nickel super-lattice may be used. The fabricated and surface-treated metallic network 30 may be embedded within an organic polymeric matrix 32 to fabricate an electrically or thermally or both an electrically and thermally conductive composite 34 (see FIG. 2). Alternatively, the fabricated metal-based microlattice may be used as a template 28 to synthesize a graphitic carbon superstructure. The metal may then be etched out to produce a graphene microstructure comprising a plurality of units wherein the units are formed of interconnected graphene tubes. The graphene tubes that form the microlattice may be arranged in an ordered structure and form symmetric patterns that repeat along the principal directions of three-dimensional space.

Figure 2:
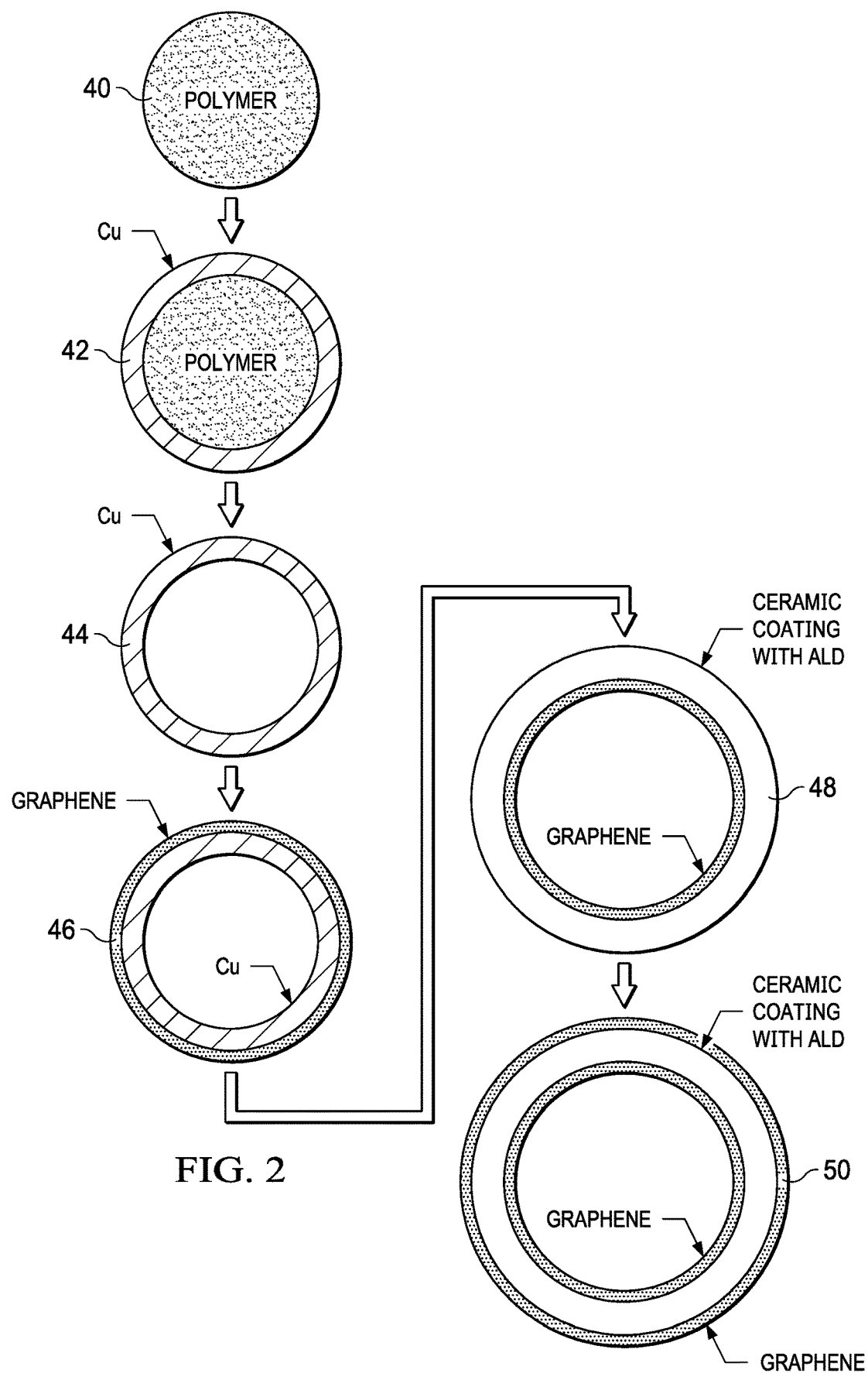
FIG. 2 is a schematic diagram of a methodology for fabricating multi-layered, $sp^2$-bonded carbon tubes.

Referring now to FIG. 2, a process for fabricating multi-layered $sp^2$-bonded carbon tubes is schematically illustrated, beginning in the upper, leftmost corner. A polymer matrix 40 of units may be created as described above using collimated UV light, a digital mask and an UV-curable resin (photomonomer). An electroless plating process may then be used to deposit a metal (e.g. copper) on the surface of the polymer to form metal-coated polymer 42. The polymer may then be removed, leaving a metal tube 44 upon which graphene may be formed to produce graphene-coated metal tube 46. The metal may then be removed by e.g. chemical etching. A ceramic coating may then be deposited (e.g. by atomic layer deposition) on the $sp^2$-bonded carbon to form ceramic-coated graphene tube 48. Another layer of $sp^2$-bonded carbon may then be deposited on the exposed surface of the ceramic coating to create a multi-layered hexagonal boron nitride tube 50. Subsequently, additional layers of ceramic coating and $sp^2$-bonded carbon may be similarly applied to create $sp^2$-bonded carbon tubes with an even greater number of layers.

Modifications are possible in the described embodiments, and other embodiments are possible, within the scope of the claims.

What is claimed is:

1. A microstructure comprising:
    interconnected units including at least: a first unit formed of first tubes that comprise a first layer of graphene, a first layer of ceramic having opposite first and second surfaces in which the first surface of the first layer of ceramic is on the first layer of graphene, and a second layer of graphene on the second surface of the first layer of ceramic; and a second unit formed of second tubes that comprise a third layer of graphene, a second layer of ceramic having opposite first and second surfaces in which the first surface of the second layer of ceramic is on the third layer of graphene, and a fourth layer of graphene on the second surface of the second layer of ceramic,
    wherein at least one of the second tubes is connected to at least one of the first tubes.

2. The microstructure of claim 1, wherein first and second tubes are arranged in an ordered structure and form symmetric patterns that repeat along principal directions of three-dimensional space.

3. The microstructure of claim 1, wherein first and second tubes form a rigid structure.

4. The microstructure of claim 1, wherein the interconnected units form a microlattice.

5. The microstructure of claim 1, wherein the first and second tubes are hollow.

6. The microstructure of claim 1, wherein the first and second tubes comprise graphene tubes interconnected by chemical electronic bonds.

7. A method of forming a multi-layered graphene microstructure, the method comprising:
    photo-initiating a polymerization of a monomer in a pattern of units to form a polymer microlattice;
    removing unpolymerized monomer;
    coating the polymer microlattice with a metal;
    removing the polymer microlattice to leave a metal microlattice;
    depositing graphitic carbon on the metal microlattice;
    converting the graphitic carbon to a first graphene layer;
    removing the metal microlattice;
    depositing ceramic on the first graphene layer;
    depositing graphitic carbon on a surface of the ceramic opposite the first graphene layer; and
    converting the graphitic carbon to a second graphene layer.

8. The method of claim 7, wherein photo-initiating the polymerization of the monomer comprises passing collimated light through a photomask.

9. The method of claim 7, wherein photo-initiating the polymerization of the monomer comprises multi-photon lithography.

10. The method of claim 7, wherein coating the polymer microlattice with the metal comprises an electroless deposition of copper.

11. The method of claim 7, wherein coating the polymer microlattice with the metal comprises an electroless deposition of nickel.

12. The method of claim 7, wherein the polymer microlattice comprises polystyrene.

13. The method of claim 7, wherein the polymer microlattice comprises poly(methyl methacrylate).

14. A multi-layered graphene microstructure prepared by a process comprising:
    photo-initiating a polymerization of a monomer in a pattern of units to form a polymer microlattice;
    removing unpolymerized monomer;
    coating the polymer microlattice with a metal;
    removing the polymer microlattice to leave a metal microlattice;
    depositing graphitic carbon on the metal microlattice;
    converting the graphitic carbon to a first graphene layer;
    removing the metal microlattice;
    depositing ceramic on the first graphene layer;
    depositing graphitic carbon on a surface of the ceramic opposite the first graphene layer; and
    converting the graphitic carbon to a second graphene layer.

15. The multi-layered graphene microstructure of claim 14, wherein photo-initiating the polymerization of the monomer comprises passing collimated light through a photomask.

16. The multi-layered graphene microstructure of claim 14, wherein photo-initiating the polymerization of the monomer comprises multi-photon lithography.

17. The multi-layered graphene microstructure of claim 14, wherein coating the polymer microlattice with the metal comprises an electroless deposition of copper.

18. The multi-layered graphene microstructure of claim 14, wherein coating the polymer microlattice with the metal comprises an electroless deposition of nickel.

19. The multi-layered graphene microstructure of claim 14, wherein the polymer microlattice comprises polystyrene.

20. The multi-layered graphene microstructure of claim 14, wherein the polymer microlattice comprises poly(methyl methacrylate).

* * * * *